(12) United States Patent
Subramanian

(10) Patent No.: US 8,170,349 B2
(45) Date of Patent: May 1, 2012

(54) GRAPHICAL RATING CONVERSION

(75) Inventor: Hariharan Subramanian, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 1071 days.

(21) Appl. No.: 12/050,817

(22) Filed: Mar. 18, 2008

(65) Prior Publication Data

US 2009/0238469 A1 Sep. 24, 2009

(51) Int. Cl.
*G06K 9/62* (2006.01)
*G06K 9/54* (2006.01)

(52) U.S. Cl. .................. 382/219; 382/305

(58) Field of Classification Search .............. 382/155, 382/254, 276, 298, 305, 312, 209, 218, 219; 707/705, 723, 748; 345/418
See application file for complete search history.

(56) References Cited

U.S. PATENT DOCUMENTS

| | | | |
|---|---|---|---|
| 6,597,406 B2 * | 7/2003 | Gloudemans et al. | 348/587 |
| 6,920,609 B1 | 7/2005 | Manber et al. | |
| 7,028,027 B1 | 4/2006 | Zha et al. | |
| 7,130,819 B2 | 10/2006 | Wang et al. | |
| 7,693,346 B2 * | 4/2010 | Myodo et al. | 382/276 |
| 7,849,116 B2 * | 12/2010 | Jacobs et al. | 707/723 |
| 7,924,323 B2 * | 4/2011 | Walker et al. | 348/231.2 |

* cited by examiner

*Primary Examiner* — Kanjibhai Patel
(74) *Attorney, Agent, or Firm* — Berkeley Law & Technology Group, LLP

(57) ABSTRACT

The subject matter disclosed herein relates to the processing of graphical rating images.

23 Claims, 8 Drawing Sheets

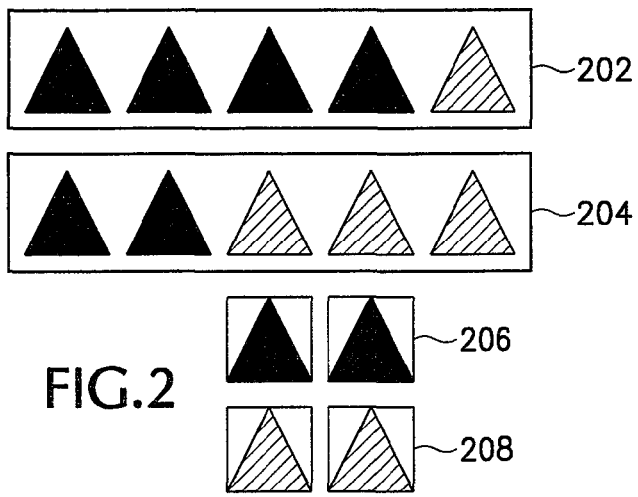
FIG.2
FIG.2A
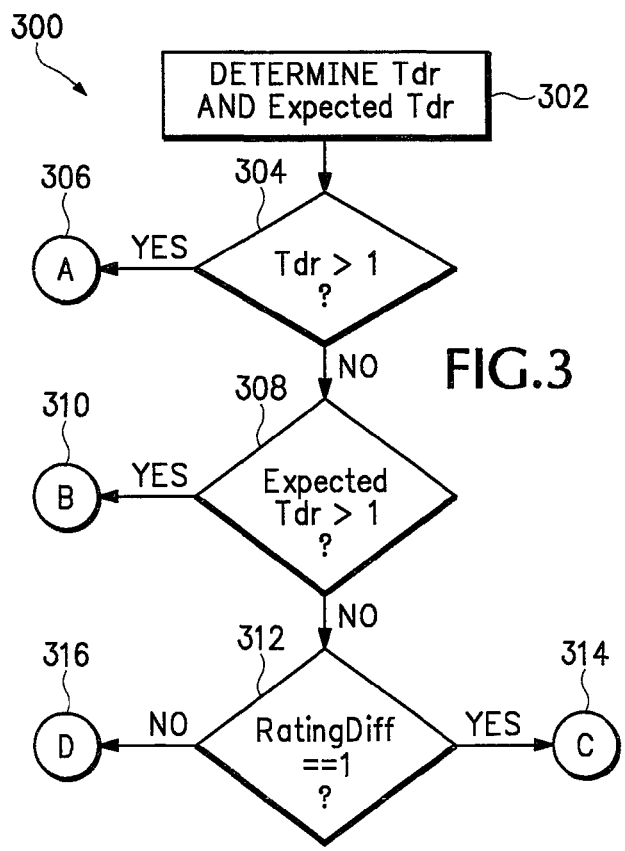
FIG.3

GRAPHICAL RATING CONVERSION

BACKGROUND

1. Field

The subject matter disclosed herein relates to the processing of graphical rating images.

2. Information

Product review websites may include a graphical rating of respective products. Such a rating may be graphically represented in an image by shapes like stars, circles, squares, or the like.

Subsequent extraction of information fields from such product review websites may extract title, images, description and/or other information fields apart from the rating image. The extracted information fields may be displayed to the user.

Further, the extracted information fields may be sorted according to values associated with those information fields. For example, the extracted information fields might be sorted in alphabetical and/or numerical order for an end user. However, in some cases, the extracted information fields may not have a preexisting value that would facilitate such a sorting process. For example, rating images might visually convey a numerical rating; however, the rating image itself may not operate so as to provide a numerical rating that would facilitate a sorting process.

DESCRIPTION OF THE DRAWING FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings in which:

FIG. 2 is a graphic diagram illustrating image difference areas of rating images in accordance with one or more embodiments;

FIG. 2A is a graphic diagram illustrating examples of image tally areas in accordance with one or more embodiments;

FIG. 3 is a flow diagram illustrating a procedure for selecting a process for determining at least one image tally area in accordance with one or more embodiments;

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of the claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail so as not to obscure the claimed subject matter.

Product review websites may include a graphical rating of respective products. Such a rating may be graphically represented in an image by shapes like stars, circles, squares, or the like. Subsequent extraction of information fields from such product review websites may extract title, images, description and/or other information fields apart from the rating image. The extracted information fields may be displayed to the user.

Further, the extracted information fields may be sorted according to values associated with those information fields. For example, the extracted information fields might be sorted in alphabetical and/or numerical order for an end user. However, in some cases, the extracted information fields may not have a pre-existing value that would facilitate such a sorting process. For example, rating images might visually convey a numerical rating; however, the rating image itself may not operate so as to provide a numerical rating that would facilitate a sorting process.

In various embodiments, such rating images may be converted into a numerical rating value. Once a numerical rating value has been determined, products may be sorted based at least in part on such numerical rating values to facilitate the identification of a highly rated product.

Figure 4:
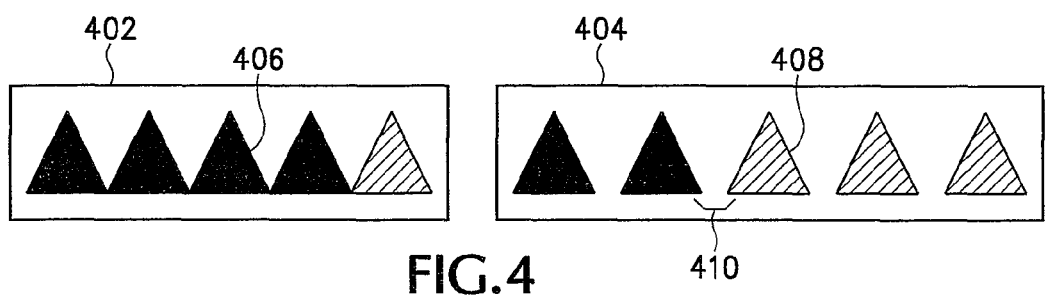
FIG. 4 is a graphic diagram illustrating examples of continuous and non-continuous images in accordance with one or more embodiments.

For example, a product review website may include rating images representing a given rating scale. Such a product review website may include rating images representing ratings from 0 to 5 on a given rating scale, for example. Here, such a rating from 0 to 5 on a given rating scale might result in 6 different rating image variations, such as a 0 rating image, a 1 rating image, a 2 rating image, a 3 rating image, a 4 rating image, and a 5 rating image, for example. Referring to FIG. 4, example rating images are illustrated in accordance with one or more embodiments. For example, rating image 402 illustrates one rating image variation having a rating of 4 on a scale of 0 to 5. Similarly, rating image 404 illustrates one rating image variation having a rating of 2 on a scale of 0 to 5. Alternatively, with the granularity of rating 0.5, there may be 11 different rating image variations for ratings from 0 to 5 on a given rating scale, for example.

In various embodiments, there may be two phases in a procedure for determining a numerical rating value. A first phase may comprise a learning phase and the second phase may comprise an extraction phase. Such a learning phase may take as training data two rating images of the same class, such as two rating images of the same website for example, and rating values associated with the respective rating images. The rating images may be analyzed to train the procedure to recognize various rating values. The extraction phase may convert an unknown rating image to a numerical rating value based at least in part on the training done in the learning phase.

Figure 1:
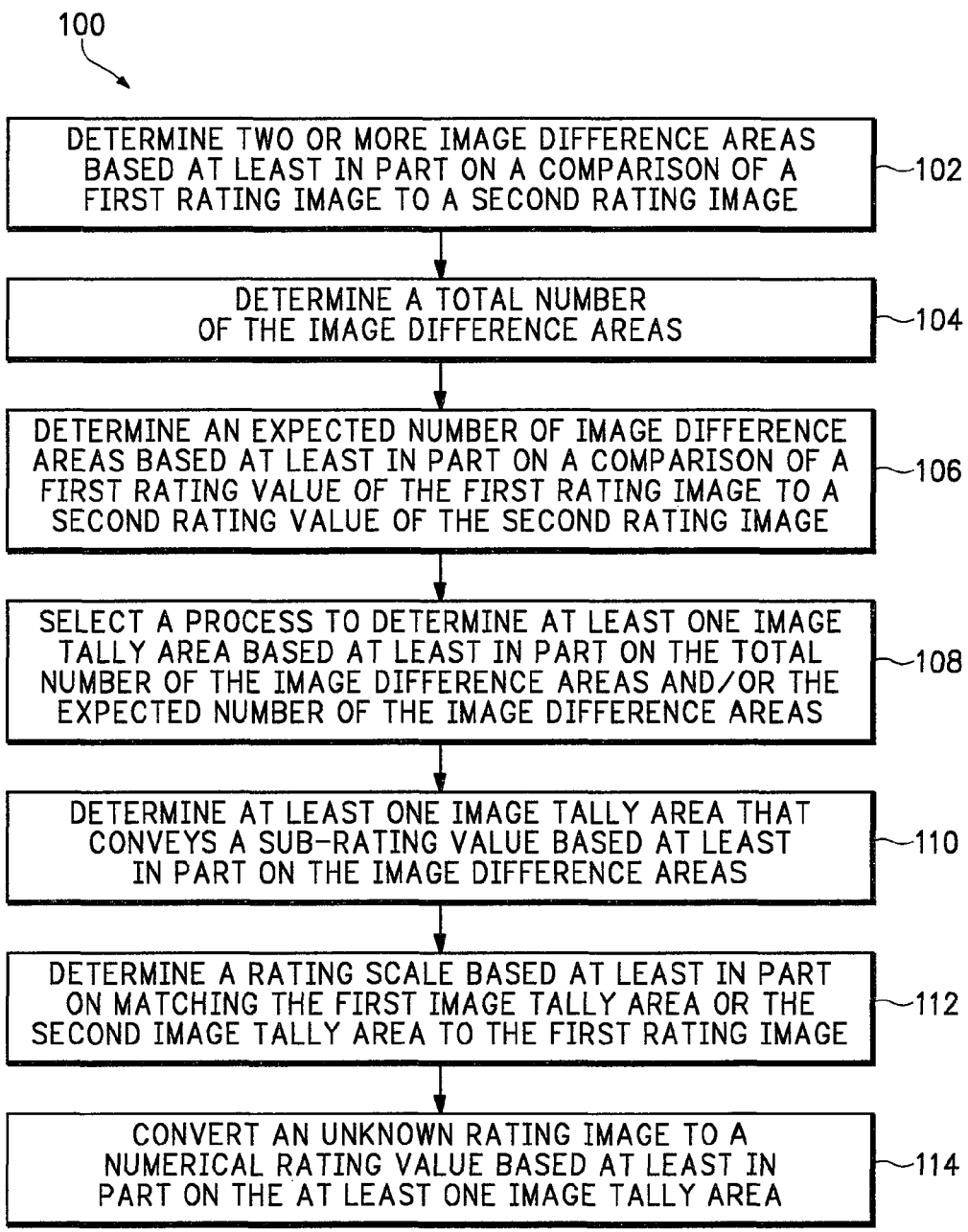
FIG. 1 is a flow diagram illustrating a procedure for determining a numerical rating value from a graphical rating image in accordance with one or more embodiments.

Procedure 100 illustrated in FIG. 1 may be used to determine a numerical rating value from a graphical rating image in accordance with one or more embodiments, for example, although the scope of claimed subject matter is not limited in this respect. Additionally, although procedure 100, as shown in FIG. 1, comprises one particular order of actions, the order in which the actions are presented does not necessarily limit claimed subject matter to any particular order. Likewise, intervening actions not shown in FIG. 1 and/or additional actions not shown in FIG. 1 may be employed and/or actions shown in FIG. 1 may be eliminated, without departing from the scope of claimed subject matter.

Procedure 100 depicted in FIG. 1 may in alternative embodiments be implemented in software, hardware, and/or firmware, and may comprise discrete operations. As illustrated, procedure 100 starts at block 102 where two or more image difference areas may be determined at the beginning of the learning phase in order to train the procedure to recognize various rating values of corresponding rating images. As used herein, the term "image difference area" may refer to an area where multiple rating images may differ from one another. For example, a first rating image of a first rating value and a second rating image of a second rating value may be compared to determine at least one image difference area in the first rating image and at least one image difference area in the second rating image. Such a comparison of the first rating image to the second rating image may comprise differentiating the first and second rating images to find the two or more image difference areas. Additionally or alternatively, determining the two or more image difference areas may comprise determining smallest rectangles enclosing an image area which differs between the first and second rating images.

Referring to FIG. 2, an example of image difference areas in accordance with one or more embodiments is illustrated. As shown, a first rating image 202 of a first rating value and a second rating image 204 of a second rating value may be compared to determine at least one image difference area in the first rating image 202 and at least one image difference area in the second rating image 204. First rating image 202 and second rating image 204 are comparable if they are in the same class. For example, first rating image 202 and second rating image 204 may not be comparable if they in different classes, such as by having a different rating scale or by having differing dimensions between the sub-images that convey the entire ratings. As used herein, the term "same class" may generally refer to first and second rating images that are similar in their form while potentially differing in their rating values.

In a particular embodiment, a comparison of first rating image 202 to second rating image 204 may comprise determining areas which differ between the two rating images 202 and 204. For example, smallest rectangles 206 may be determined to enclose an image area of first rating image 202 which differs between the second rating image 204. Similarly, smallest rectangles 208 may be determined to enclose an image area of second rating image 204 which differs between first rating image 202. For example, such a comparison of the first rating image 202 to the second rating image 204 may comprise differentiating first and second rating images 202 and 204 to find the two or more image difference areas 206 and 208.

Referring back to FIG. 1, at block 104 a total number of the image difference areas may be determined. Referring to FIG. 2, for example, rectangles 206 that were determined above to enclose image areas of first rating image 202 which differ between the second rating image 204 are illustrated here as comprising a total number of two image difference areas. Similarly, rectangles 208 that were determined above to enclose an image area of second rating image 204 which differs between first rating image 202 are illustrated here as comprising a total number of two image difference areas.

Referring back to FIG. 1, at block 106 an expected number of image difference areas 206 and 208 may be determined based at least in part on a comparison of the first rating value to the second rating value. Referring to FIG. 2, for example, image difference area 206 may comprise a first rating value of four and image difference area 208 may comprise a second rating value of two. In such a case, an expected number of image difference areas may be determined based on the following formula:

$$\text{Expected}Tdr = \text{ceil}(\text{Rating1}) - \text{floor}(\text{Rating2}) \quad (1)$$

where ExpectedTdr is defined to be an expected number of image difference areas, ceil(Rating1) is defined to be a first rating value with a higher relative value, and floor(Rating2) is defined to be a second rating value with a lower relative value. As illustrated, the total number of the image difference areas 206 and 208 are equal to the number of image difference areas 206 and 208; however, that is not always the case, as will be discussed in further detail below.

Referring back to FIG. 1, at block 108 a process may be selected to determine at least one image tally area based at least in part on a total number of the image difference areas and/or the expected number of the image difference areas. Referring to FIG. 2A, examples of image tally areas in accordance with one or more embodiments are illustrated. As used herein, the term "image tally area" may refer to a sub-image area of a rating image that conveys a sub-rating value, such as one, zero, one half, the like, and/or combinations thereof. For example, image tally area 210 illustrates a sub-image area of a rating image that conveys a sub-rating value of one, image tally area 212 illustrates a sub-image area of a rating image that conveys a sub-rating value of zero, and image tally area 214 illustrates a sub-image area of a rating image that conveys a sub-rating value of one half. For example, the total number of the image difference areas and/or the expected number of the image difference areas may provide useful information in processing the rating images.

Referring to FIG. 4, an example of a continuous rating image and a non-continuous rating image is illustrated in accordance with one or more embodiments. A continuous rating image 402 may comprise several image tally areas 406 that may be directly adjacent and/or contacting one another. In cases where a continuous rating image 402 is being analyzed, the total number of the image difference areas (also referred to herein as Tdr) produced by differentiation is one. Alternately, a non-continuous rating image 404 may comprise several image tally areas 408 that may be spatially separated from one another by a distance dimension 410, for example. In cases where the total number of the image difference areas (Tdr) is more than one, then the rating image is a non-continuous rating image 404. For non-continuous images 404, the total number of the image difference areas (Tdr) may be equal to the expected number of the image difference areas (Expected Tdr). Alternately, in cases where the total number of the image difference areas (Tdr) is not equal to the expected number of the image difference areas (Expected Tdr) then the rating image may be found to be a continuous rating image 402. In cases where the total number of the image difference areas (Tdr) and the expected number of the image difference areas (Expected Tdr) are equal to one then the first rating value and the second rating value may differ only in decimal part. As will be discussed in greater detail below, the total number of the image difference areas (Tdr) and/or the expected number of the image difference areas (Expected Tdr) may provide useful information in processing the rating images.

At block 110 at least one image tally area that conveys a sub-rating value may be determined based at least in part on the image difference areas 206 and 208. As will be described in greater detail below, an image tally area may be determined in the learning phase from the supplied first and second rating images 202 and 204, and may then be utilized in the extraction phase to convert an unknown rating image to a numerical rating value based at least in part on the training done in the learning phase. As used herein, the term "image tally area" may refer to a sub-image area of a rating image that conveys a sub-rating value, such as one, zero, one half, the like, and/or combinations thereof.

For example, referring to FIG. 3, procedure 300 may be used to select a process for determining at least one image tally area in accordance with one or more embodiments, although the scope of claimed subject matter is not limited in this respect. Additionally, although procedure 300, as shown in FIG. 3, comprises one particular order of actions, the order in which the actions are presented does not necessarily limit claimed subject matter to any particular order. Likewise, intervening actions not shown in FIG. 3 and/or additional actions not shown in FIG. 3 may be employed and/or actions shown in FIG. 3 may be eliminated, without departing from the scope of claimed subject matter.

Procedure 300 depicted in FIG. 3 may in alternative embodiments be implemented in software, hardware, and/or firmware, and may comprise discrete operations. As illustrated, procedure 300 starts at block 302 where the total number of the image difference areas (also referred to herein as Tdr) and/or the expected number of the image difference areas (also referred to herein as Expected Tdr) may be determined. As will be discussed in greater detail below, the total number of the image difference areas (Tdr) and/or the expected number of the image difference areas (Expected Tdr) may provide useful information in processing the rating images.

At block 304, a decision may be made to determine whether a total number of the image difference areas (Tdr) is greater than one. In cases where the total number of the image difference areas (Tdr) is greater than one, procedure 300 may proceed to block 306 where a first procedure A may be executed to determine at least one image tally area that conveys a sub-rating value based at least in part on the image difference areas 206 and 208. In cases where the total number of the image difference areas (Tdr) is more than one, the rating image may comprise a non-continuous rating image 404 (as illustrated in FIG. 4). For non-continuous images 404 a total number of the image difference areas (Tdr) may be equal to an expected number of the image difference areas (Expected Tdr).

Figure 5:
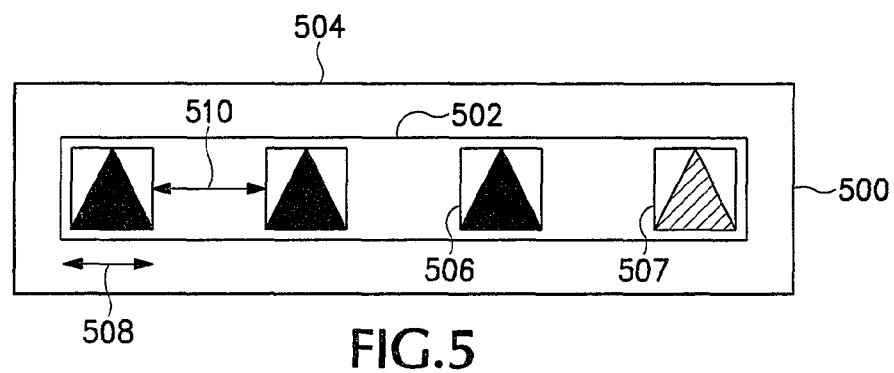
FIG. 5 is a graphic diagram illustrating an example of a rating image in accordance with one or more embodiments.

In one implementation, procedure A may determine at least one image tally area that conveys a sub-rating value based at least in part on image difference areas. Referring to FIG. 5, an example of a rating image in accordance with one or more embodiments is illustrated. As shown, a rating image 500 may be measured and/or partitioned into several sub-parts. For example, a contiguous area may be defined around a data conveying part 502 of rating image 500, which defines a sub-image portion of rating image 500 that conveys the rating value, so as to separate data conveying part 502 from a non-data conveying part 504 of rating image 500, which defines a sub-image portion of rating image 500 that conveys no rating value. Additionally, rectangles may be determined so as to enclose one or more image tally areas 506 and 507 of rating image 500 that conveys a zero rating (as shown), a one rating, and/or a half rating. A length 508 of image tally areas 506 and 507 and/or distance dimension 510 of image tally areas 506 and 507 may also be determined during the learning phase.

Figure 6:
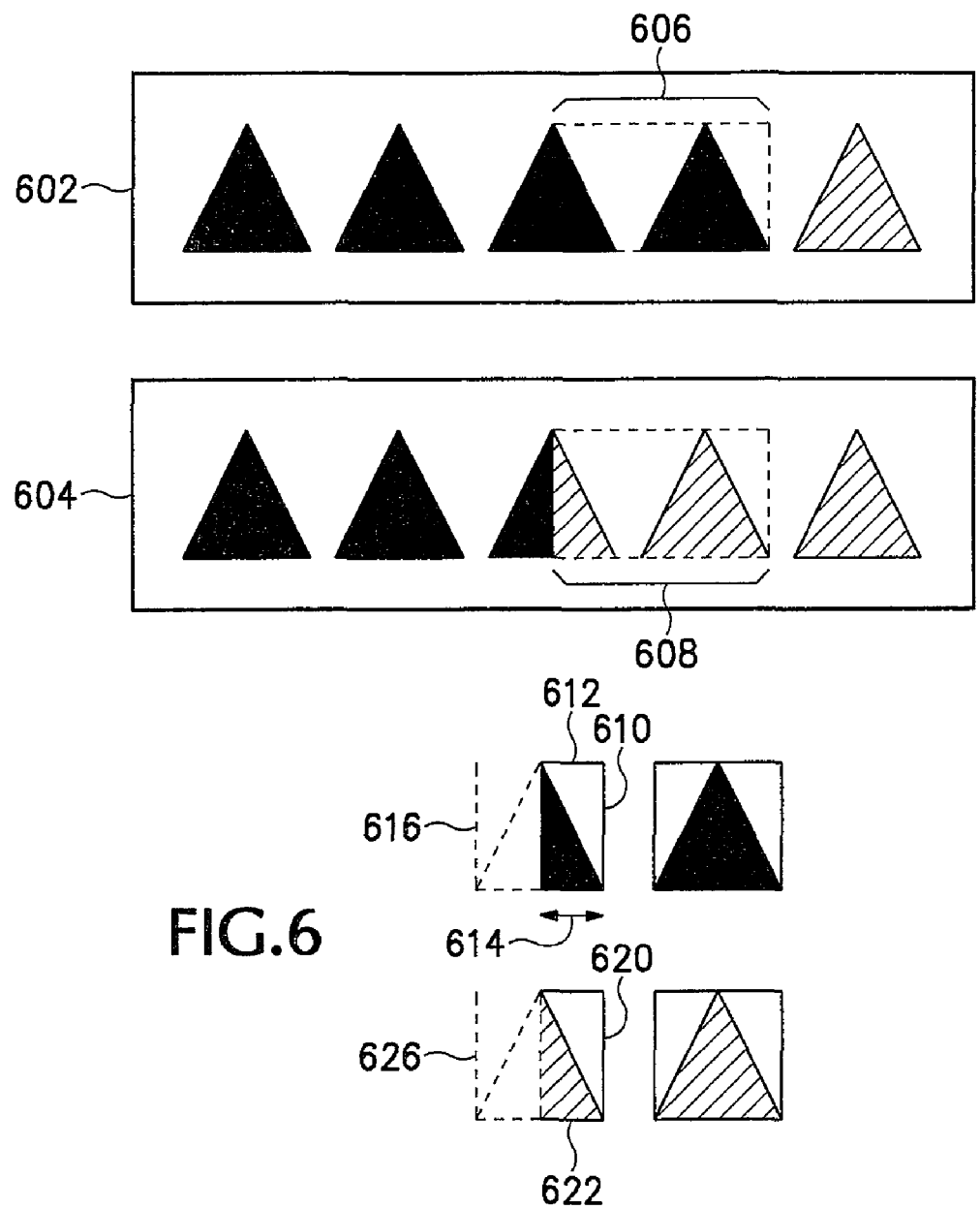
FIG. 6 is a graphic diagram illustrating an example of an image tally area in accordance with one or more embodiments.

For example, determining image tally area 506 may include determining a smallest rectangle enclosing an image area that conveys a rating of one to define a first image tally area 506. Additionally or alternatively, determining image tally area 507 may include determining a smallest rectangle enclosing an image area that conveys a rating of zero to define a second image tally area 507. Referring to FIG. 6, an example of an image tally area in accordance with one or more embodiments is illustrated. Based at least in part on image difference area 606 of first rating image 602, a right end 610 of first image tally area 612 may be determined. A left end 616 of first image tally area 612 may be determined based, at least in part, on associating length dimension 614 with right end 610. For example, to compensate for fractional values for first rating image 602, left end 616 may be determined based on the following formula:

$$\text{LeftEnd} = \text{DiffRect.RightEnd} - \text{DiffRect.Length}/(1-\text{Fraction2}) \quad (2)$$

where Fraction2 is defined to be the decimal part of a second rating value of second rating image 604, DiffRect.RightEnd is defined to be the location of the right end of the rectangle surrounding the first portion of image difference area 606, and DiffRect.Length is defined to be the length dimension 614 of the first image tally area 612.

Additionally or alternatively, based at least in part on the image difference area 608 of second rating image 604, a right end 620 of first image tally area 622 may be determined. A left end 626 of second image tally area 622 may be determined based, at least in part, on associating length dimension 614 with right end 620. For example, to compensate for fractional values for second rating image 604, left end 626 may be determined based on the following formula:

$$\text{LeftEnd} = \text{DiffRect.RightEnd} - \text{DiffRect.Length}/(1-\text{Fraction2}) \quad (2)$$

where Fraction2 is defined to be the decimal part of a second rating value of second rating image 604, DiffRect.RightEnd is defined to be the location of the right end of the rectangle surrounding the first portion of image difference area 608, and DiffRect.Length is defined to be the length dimension 614 of the first image tally area 612. Accordingly, both first image tally area 612 that conveys a rating of one and second image tally area 622 that conveys a rating of zero may be extracted from first rating image 602 and second rating image 604.

Referring to FIG. 3, in cases where the total number of the image difference areas (Tdr) is not greater than one, procedure 300 may proceed to block 308. At block 308, a decision may be made to determine whether the expected number of the image difference areas (Expected Tdr) is greater than one.

In cases where the expected number of the image difference areas (Expected Tdr) is greater than one the rating image may be analyzed as a continuous rating image 402 (as illustrated in FIG. 4), and procedure 300 may proceed to block 310 where a second procedure B may be executed to determine at least one image tally area that conveys a sub-rating value based at least in part on the image difference areas 206 and 208 (as illustrated in FIG. 2).

Figure 7:
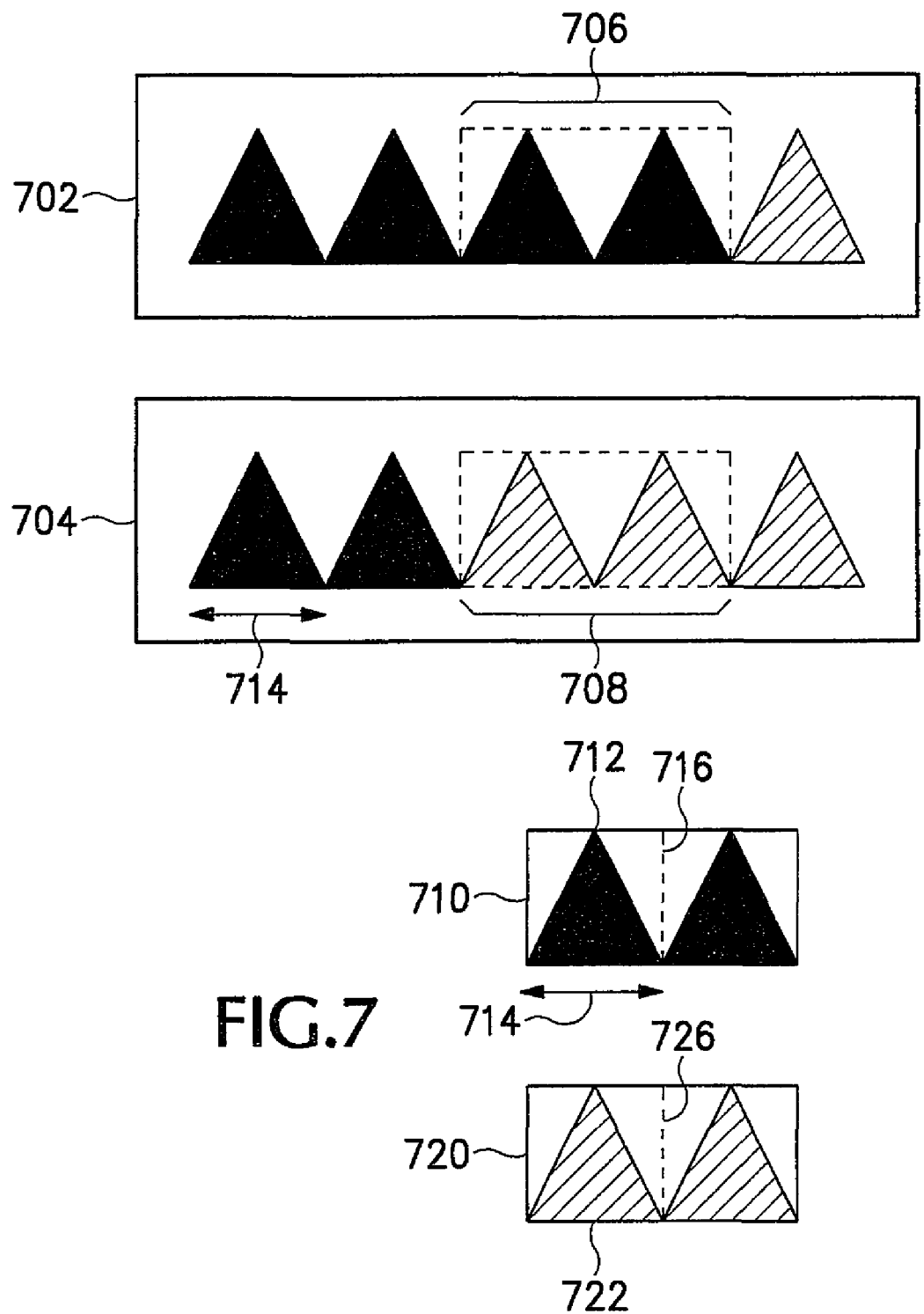
FIG. 7 is a graphic diagram illustrating an example of an image tally area in accordance with one or more embodiments.

In one implementation, procedure B may determine at least one image tally area that conveys a sub-rating value based at least in part on image difference areas. For example, determining an image tally area may include determining a smallest rectangle enclosing an image area that conveys a rating of one to define a first image tally area and/or determining a smallest rectangle enclosing an image area that conveys a rating of zero to define a second image tally area. Referring to FIG. 7, an example of an image tally area in accordance with one or more embodiments is illustrated. Based at least in part on the image difference area 706 of first rating image 702, a left end 710 of first image tally area 712 may be determined. As first rating image 702 is continuous, first rating image 702 may comprise several image tally areas that may be directly adjacent and/or contacting one another. Accordingly, image difference area 706 may not be separable into several image tally areas and may comprise a rectangle containing more than one image tally area. Length dimension 714 may be determined by dividing length of image difference area 706 by a difference between the first rating value of first rating image 702 and the second rating value of second rating image 704. Based at least in part on an association of length dimension 714 with a left end of the rectangle surrounding image difference area 706, a left end 710 of first image tally area 712 may be determined. In some cases a left end of the rectangle surrounding image difference area 706 and a left end 710 of first image tally area 712 may be the same; however, left end 710 and a left end of the rectangle surrounding image difference area 706 may not coincide where first rating image 702 has a fractional value. For example, to compensate for fractional values for first rating image 702, left end 710 may be determined based on the following formula:

$$\text{LeftEnd} = \text{DiffRect.LeftEnd} - \text{LengthDimension} * (1 - \text{Fraction2}) \quad (3)$$

where Fraction2 is defined to be the decimal part of the second rating value of second rating image 704 and DiffRect.LeftEnd is defined to be the location of the left end of the rectangle surrounding image difference area 706. Based at least in part on an association of length dimension 714 with left end 710, a right end 716 of first image tally area 712 may be determined. For example, right end 716 may be determined based on the following formula:

$$\text{RightEnd} = \text{LeftEnd} + \text{LengthDimension} \quad (4).$$

Additionally or alternatively, based at least in part on image difference area 708 of second rating image 704 a left end 720 of second image tally area 722 may be determined. Based at least in part on an association of length dimension 714 with left end 720, a right end 726 of second image tally area 722 may be determined. Accordingly, both first image tally area 712 that conveys a rating of one and second image tally area 722 that conveys a rating of zero may be extracted from first rating image 702 and second rating image 704.

Alternatively, a similar process may be utilized to determine a right end 716 of first image tally area 712 based, at least in part, on an association of length dimension 714 with a right end of the rectangle surrounding image difference area 706, a left end 710 of first image tally area 712 may be determined. For example, to compensate for fractional values for first rating image 702, right end 716 may be determined based on the following formula:

$$\text{RightEnd} = \text{DiffRect.RightEnd} + \text{LengthDimension} * (1 - \text{Fraction1}) \quad (5)$$

where Fraction1 is defined to be the decimal part of the first rating value of first rating image 702 and DiffRect.RightEnd is defined to be the location of the right end of the rectangle surrounding image difference area 706. Based at least in part on an association of length dimension 714 with right end 716, a left end 710 of first image tally area 712 may be determined. For example, left end 710 may be determined based on the following formula:

$$\text{LeftEnd} = \text{RightEnd} + \text{LengthDimension} \quad (6).$$

Referring to FIG. 3, in cases where the expected number of the image difference areas (Expected Tdr) is not greater than one, procedure 300 may proceed to block 312. At block 312, a decision may be made to determine whether a difference between the total number of the image difference areas (Tdr) and the expected number of the image difference areas (Expected Tdr) is equal to one. In cases where a difference between the total number of the image difference areas (Tdr) and the expected number of the image difference areas (Expected Tdr) is equal to one, procedure 300 may proceed to block 314. At block 314 a third procedure C may be executed to determine at least one image tally area that conveys a sub-rating value based at least in part on the image difference areas 206 and 208 (as illustrated in FIG. 2).

Figure 8:
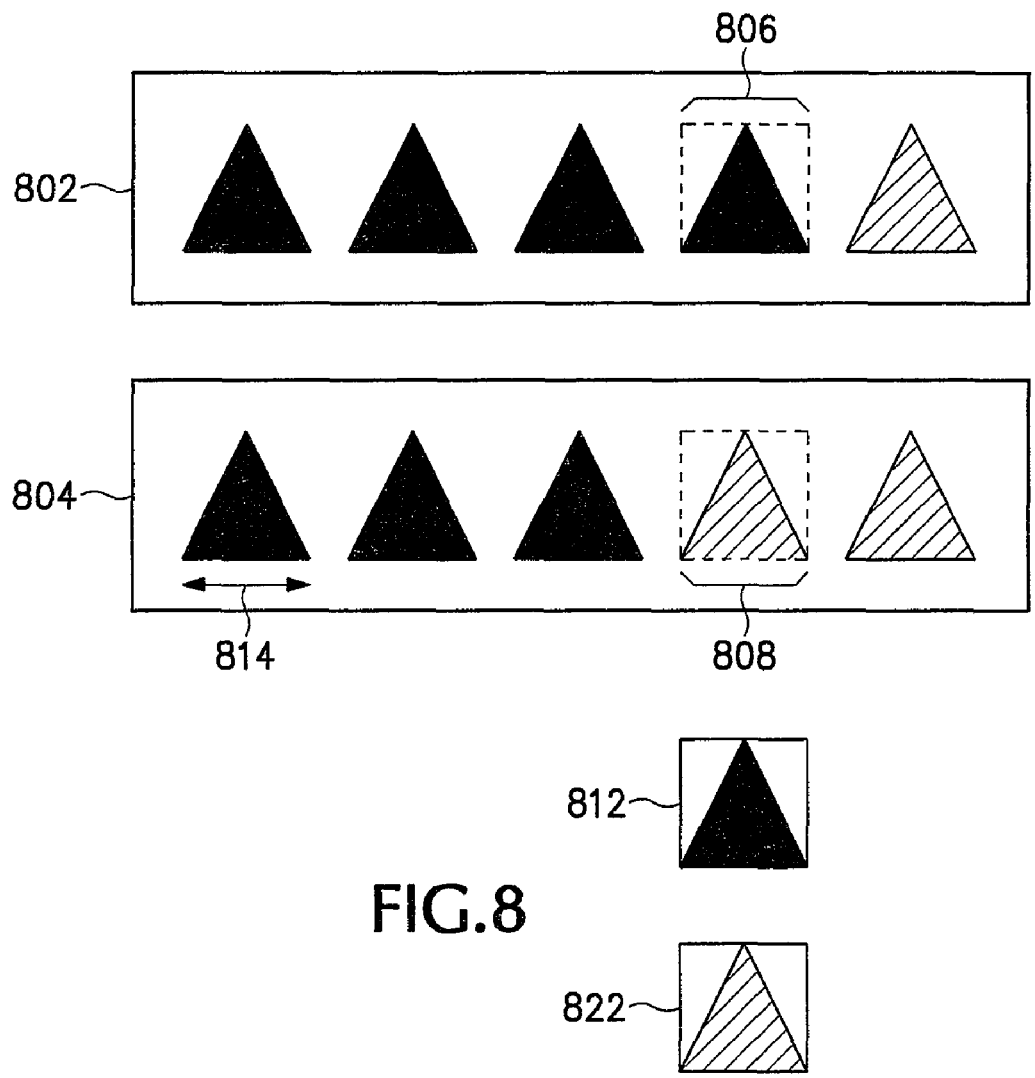
FIG. 8 is a graphic diagram illustrating an example of an image tally area in accordance with one or more embodiments.

In one implementation, procedure C may determine at least one image tally area that conveys a sub-rating value based at least in part on the image difference areas. For example, determining an image tally area may include determining a smallest rectangle enclosing an image area that conveys a rating of one to define a first image tally area and/or determining a smallest rectangle enclosing an image area that conveys a rating of zero to define a second image tally area. Referring to FIG. 8, an example of an image tally area in accordance with one or more embodiments is illustrated. Based at least in part on the image difference area 806 of first rating image 802, a first image tally area 812 and length dimension 814 may be determined. Additionally or alternatively, based at least in part on the image difference area 808 of second rating image 804, a second image tally area 822 may be determined. As discussed above, third procedure C may be executed in cases where a difference between the first rating value and the second rating value approach one, and may not differ in decimal part. Additionally, third procedure C may be executed in cases where a total number of the image difference areas (Tdr) is not greater than one and where the expected number of the image difference areas (Expected Tdr) is also not greater than one. Accordingly, both first image tally area 812 that conveys a rating of one and second image tally area 822 that conveys a rating of zero may be extracted from first rating image 802 and second rating image 804.

Referring to FIG. 3, in cases where the difference between the total number of the image difference areas (Tdr) and the expected number of the image difference areas (Expected Tdr) is not equal to one, procedure 300 may proceed to block 316. At block 316, a fourth procedure D may be executed to determine at least one image tally area that conveys a sub-rating value based at least in part on the image difference areas 206 and 208 (as illustrated in FIG. 2). In cases where a total number of the image difference areas (Tdr) and an expected number of the image difference areas (Expected Tdr) are equal to one the first rating value and the second rating value may differ only in decimal part.

Figure 9:
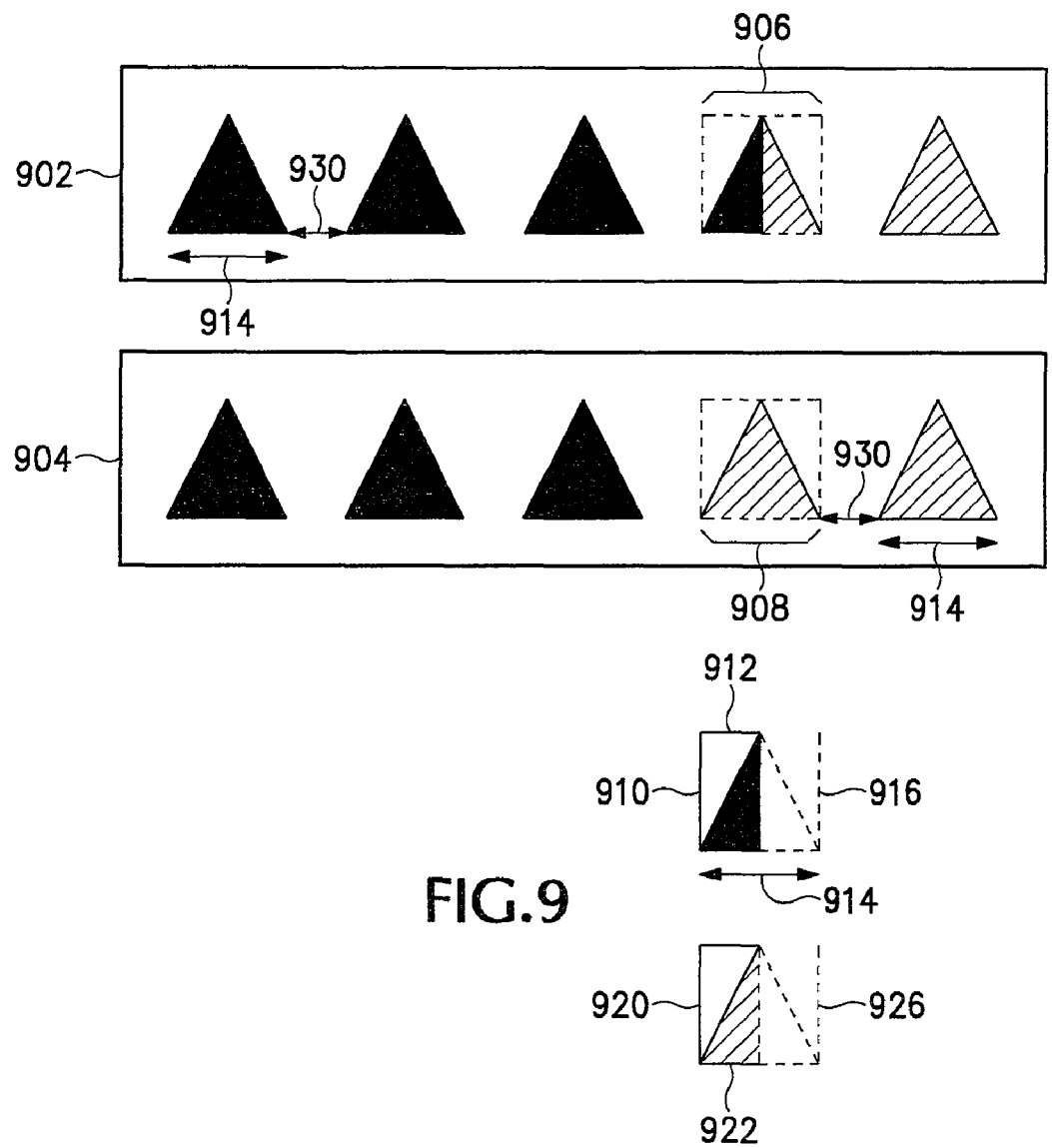
FIG. 9 is a graphic diagram illustrating an example of an image tally area in accordance with one or more embodiments.

In one implementation, procedure D may determine at least one image tally area that conveys a sub-rating value based at least in part on the image difference areas. For example, determining an image tally area may include determining a smallest rectangle enclosing an image area that conveys a rating of one to define a first image tally area. Additionally, determining an image tally area may include determining a smallest rectangle enclosing an image area that conveys a rating of zero to define a second image tally area. Referring to FIG. 9, an example of an image tally area in accordance with one or more embodiments is illustrated. Based at least in part on the image difference area 906 of first rating image 902, a right end 916 of first image tally area 912 may be determined. For example, to compensate for fractional values for first rating image 902, right end 916 may be determined based on the following formula:

$$RightEnd = DiffRect.RightEnd + LengthDimension*Fraction1 \qquad (7)$$

where Fraction1 is defined to be a decimal part of a first rating value of first rating image 902 and DiffRect.RightEnd is defined to be the location of the right end of the rectangle surrounding image difference area 906. A similar process may be utilized to determine a left end 910 of first image tally area 912 based, at least in part, on the image difference area 906 of first rating image 902. For example, to compensate for fractional values for first rating image 902, left end 910 may be determined based on the following formula:

$$LeftEnd = DiffRect.LeftEnd - LengthDimension*Fraction2 \qquad (8)$$

where Fraction2 is defined to be the decimal part of the second rating value of second rating image 904 and DiffRect.LeftEnd is defined to be the location of the left end of the rectangle surrounding image difference area 906. Alternatively or additionally, right end 926 and left end 920 of second image tally area 922 may also be determined in a similar manner.

In cases where the first rating value of first rating image 902 is a fractional value, a full second image tally area 922 that conveys a rating of zero may be present in second rating image 904. Such is the case where, as here, first rating image 902 is defined to be greater in value than second rating image 904, a first rating value and the second rating value may differ only in decimal part, and a first rating image 902 has a fractional value. Accordingly, second image tally area 922 that conveys a rating of zero may be extracted from second rating image 904. For example, second image tally area 922 may be matched from the right side of second rating image 904 to determine distance dimension 930. First image tally area 912 may then be matched from the left side of second rating image 904. For example, first image tally area 912 may first be matched from the left side of second rating image 904, where one or more subsequent matches may be made by shifting over to the right based at least in part on length dimension 914 and distance dimension 930. In cases where the first rating value of first rating image 902 is 0.5 and the second rating value of second rating image 904 is zero then only second image tally area 922 that conveys a rating of zero may be extracted. Accordingly, first image tally area 912 may be undefined at the end of the learning phase.

In cases where the first rating value of first rating image 902 is an integer value, a full first image tally area 912 that conveys a rating of one may be present in first rating image 902. Such is the case where, as here, first rating image 902 is defined to be in greater value than second rating image 904, the first rating value and the second rating value may differ only in decimal part, and the first rating image 902 has an integer value. Accordingly, first image tally area 912 that conveys a rating of one may be extracted from first rating image 902. For example, first image tally area 912 may be matched from the left side of first rating image 902 to determine distance dimension 930. Second image tally area 922 may then be matched from the right side of first rating image 902 based at least in part on length dimension 914 and distance dimension 930. In cases where the first rating value of first rating image 902 equals the rating scale and the second rating value of second rating image 904 equals a value of the rating scale minus 0.5 then only first image tally area 912 that conveys a rating of one may be extracted. Accordingly, second image tally area 922 may be undefined at the end of the learning phase.

Referring back to FIG. 1, at block 112 a rating scale may be determined based at least in part on matching the image tally area to the first rating image. For example, in some cases a first image tally area that conveys a rating of one may have been determined. In such a case, a rating scale may be determined or partially determined based at least in part on matching a first image tally area to the first rating image. Alternatively or additionally, in some cases a second image tally area that conveys a rating of zero may have been determined. In such a case, a rating scale may be determined based at least in part on matching a second image tally area (associated with a zero value) to the first rating image and adding resultant matches to the first rating value.

At block 114, an unknown rating image may be converted to a numerical rating value based at least in part on the image tally area. For example, such a conversion of an unknown rating image to a numerical rating value may be based at least in part on matching the first image tally area or the second image tally area to the unknown rating image. For example, in some cases a first image tally area that conveys a rating of one may have been determined. In such a case, an unknown rating image may be converted to a numerical rating value based at least in part on matching the first image tally area (associated with a one value) from a left side of the unknown rating image. After an initial match of the first image tally to the left side of the unknown rating image is made, additional matches may be made by shifting over to the right by the distance dimension determined in the learning phase. Additional matches may be counted until no match can be found and a numerical rating value is returned.

Similarly, in some cases a second image tally area that conveys a rating of zero may have been determined. In such a case, an unknown rating image may be converted to a numerical rating value based at least in part on matching the second image tally area (associated with a zero value) from a right side of the unknown rating image. The number of resultant matches may be subtracted from a rating scale of the unknown rating image, for example. After an initial match of the second image tally to the right side of the unknown rating image is made, additional matches may be made by shifting over to the left by the distance dimension determined in the learning phase. Additionally or alternatively, by pasting the first half of a first image tally area that conveys a rating of one and the second half of a second image tally area that conveys a rating of zero, a third image tally area that conveys a rating of one half may be obtained. Such a third image tally area that conveys a rating of one half may be utilized in a conversion of an unknown rating image to a numerical rating value by converting an unmatched decimal value portion of the rating value.

In operation, two rating images and their respective rating values may be provided as input for a learning phase for a semi-automated extraction product, instead of providing rating values for all the variations of a given rating image format. The procedures described herein primarily operate via pattern recognition versus image processing. Further, the procedures described herein do not infer the shape of the rating image, nor does the procedure try to infer from the color of the rating image to identify fully shaded shapes and/or fully blank shapes. Accordingly, the procedures described herein do not require fuzzy logic or artificial intelligence techniques to operate successfully.

In one implementation, the two different rating images may be compared to determine two or more image difference areas. For example, such image difference areas may include an area containing a fully shaded shape and/or a fully blank shape. Based at least in part on the identified fully shaded shape and/or fully blank shape, a rating scale for the rating images may be determined. Such a rating scale may be determined by a sum of a number of matches of the fully blank shape in a rating image added to the rating value of that rating image, for example. Alternatively or additionally, in situations where a fully blank shape does not occur in the rating image, such a rating scale may be determined by a number of matches of the identified fully shaded shape in the rating image, for example. Once a fully shaded shape and/or a fully blank shape have been identified and the rating scale has been determined, the procedure may proceed to an extraction phase. In the extraction phase, the numerical rating value of an unknown rating image may be determined based on either a fully shaded shape and/or a fully blank shape along with the rating scale. For example, where a fully shaded shape is available the numerical rating value of an unknown rating image can be found by counting the occurrences of the fully shaded shape in the unknown rating image. Similarly, where a fully blank shape and the rating scale are available, then the numerical rating value can be found by counting the occurrences of the fully blank shape and subtracting it from the rating scale. The determined numerical rating values of one or more rating images may then be used to sort products according to their respective ratings.

Figure 10:
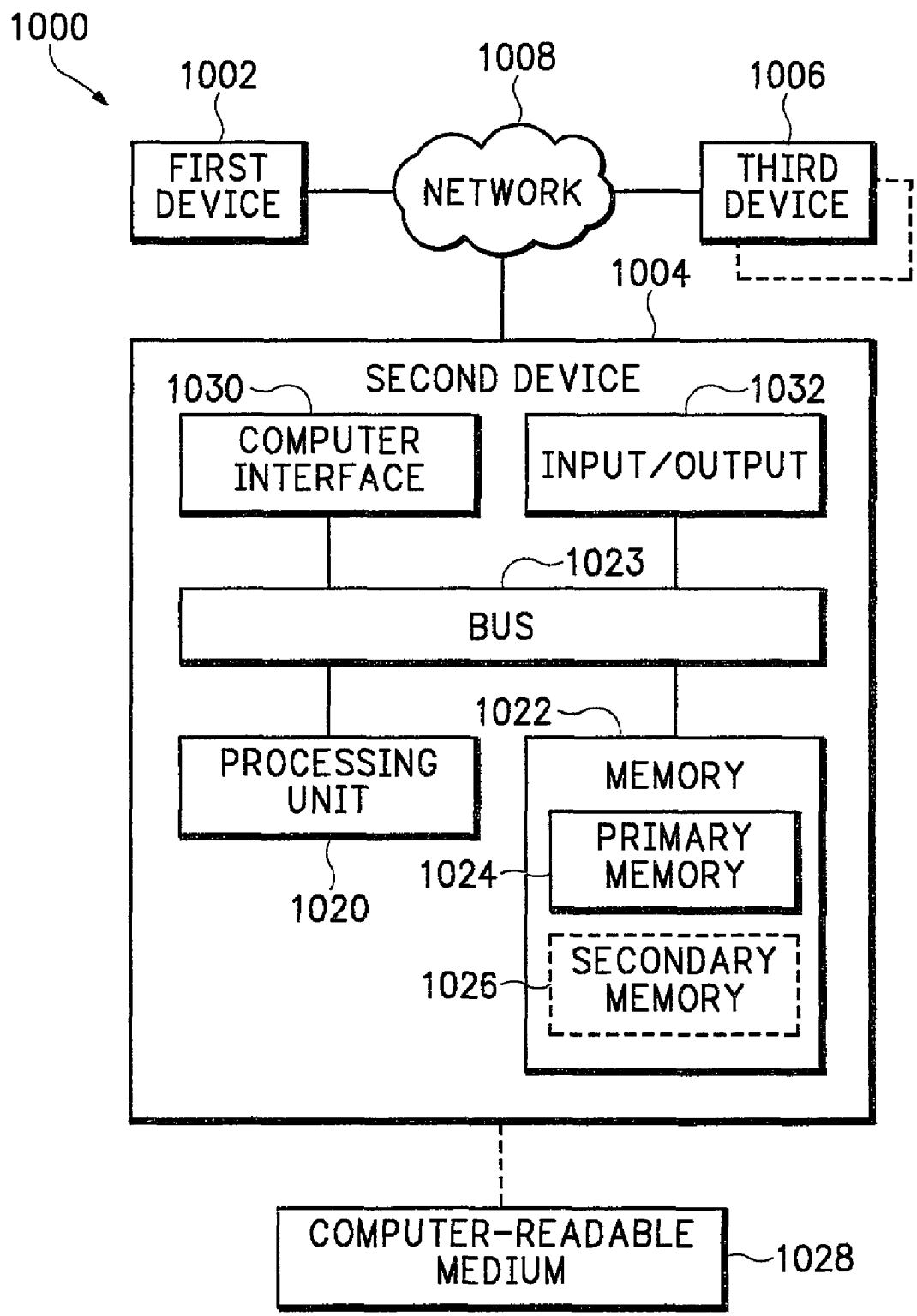
FIG. 10 is a schematic diagram of a computing platform in accordance with one or more embodiments.

FIG. 10 is a schematic diagram illustrating an exemplary embodiment of a computing environment system 1000 that may include one or more devices configurable to determine a numerical rating value from a graphical rating image using one or more techniques illustrated above, for example. System 1000 may include, for example, a first device 1002, a second device 1004 and a third device 1006, which may be operatively coupled together through a network 1008.

First device 1002, second device 1004 and third device 1006, as shown in FIG. 10, may be representative of any device, appliance or machine that may be configurable to exchange data over network 1008. By way of example but not limitation, any of first device 1002, second device 1004, or third device 1006 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

Similarly, network 1008, as shown in FIG. 10, is representative of one or more communication links, processes, and/or resources configurable to support the exchange of data between at least two of first device 1002, second device 1004, and third device 1006. By way of example but not limitation, network 1008 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

As illustrated, for example, by the dashed lined box illustrated as being partially obscured of third device 1006, there may be additional like devices operatively coupled to network 1008.

It is recognized that all or part of the various devices and networks shown in system 1000, and the processes and methods as further described herein, may be implemented using or otherwise include hardware, firmware, software, or any combination thereof.

Thus, by way of example but not limitation, second device 1004 may include at least one processing unit 1020 that is operatively coupled to a memory 1022 through a bus 1023.

Processing unit 1020 is representative of one or more circuits configurable to perform at least a portion of a data computing procedure or process. By way of example but not limitation, processing unit 1020 may include one or more processors, controllers, microprocessors, microcontrollers, application specific integrated circuits, digital signal processors, programmable logic devices, field programmable gate arrays, and the like, or any combination thereof.

Memory 1022 is representative of any data storage mechanism. Memory 1022 may include, for example, a primary memory 1024 and/or a secondary memory 1026. Primary memory 1024 may include, for example, a random access memory, read only memory, etc. While illustrated in this example as being separate from processing unit 1020, it should be understood that all or part of primary memory 1024 may be provided within or otherwise co-located/coupled with processing unit 1020.

Secondary memory 1026 may include, for example, the same or similar type of memory as primary memory and/or one or more data storage devices or systems, such as, for example, a disk drive, an optical disc drive, a tape drive, a solid state memory drive, etc. In certain implementations, secondary memory 1026 may be operatively receptive of, or otherwise configurable to couple to, a computer-readable medium 1028. Computer-readable medium 1028 may include, for example, any medium that can carry and/or make accessible data, code and/or instructions for one or more of the devices in system 1000.

Second device 1004 may include, for example, a communication interface 1030 that provides for or otherwise supports the operative coupling of second device 1004 to at least network 1008. By way of example but not limitation, communication interface 1030 may include a network interface device or card, a modem, a router, a switch, a transceiver, and the like.

Second device 1004 may include, for example, an input/output 1032. Input/output 1032 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 1032 may include an operatively configured display, speaker, keyboard, mouse, trackball, touch screen, data port, etc.

With regard to system 1000, in certain implementations first device 1002 may be configurable to determine a numerical rating value from a graphical rating image using one or more techniques illustrated above. For example, such a procedure to determine numerical rating values may operate by having first device 1002 receive two rating images and their respective rating values as input for a learning phase for a semi-automated extraction process. Once the learning phase is completed the procedure may proceed to an extraction phase. In the extraction phase, such a procedure may have first device 1002 access network 1008 to retrieve content items for the creation of a result set. Based on the result set, first device 1002 may determine numerical rating values of unknown rating images and/or may sort the result set based at least in part on the determined numerical rating values.

It should also be understood that, although particular embodiments have just been described, the claimed subject matter is not limited in scope to a particular embodiment or implementation. For example, embodiments claimed may include one or more apparatuses for performing the operations herein. These apparatuses may be specially constructed for the desired purposes, or they may comprise a general purpose computing platform selectively activated and/or reconfigured by a program stored in the device. The processes and/or displays presented herein are not inherently related to any particular computing platform and/or other apparatus. Various general purpose computing platforms may be used with programs in accordance with the teachings herein, or it may prove convenient to construct a more specialized computing platform to perform the desired method. The desired structure for a variety of these computing platforms will appear from the description above.

Embodiments claimed may include algorithms, programs and/or symbolic representations of operations on data bits or binary digital signals within a computer memory capable of performing one or more of the operations described herein. Although the scope of claimed subject matter is not limited in this respect, one embodiment may be in hardware, such as implemented to operate on a device or combination of devices, whereas another embodiment may be in software. Likewise, an embodiment may be implemented in firmware, or as any combination of hardware, software, and/or firmware, for example. These algorithmic descriptions and/or representations may include techniques used in the data processing arts to transfer the arrangement of a computing platform, such as a computer, a computing system, an electronic computing device, and/or other information handling system, to operate according to such programs, algorithms, and/or symbolic representations of operations. A program and/or process generally may be considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities. In addition, embodiments are not described with reference to any particular programming language. It will be appreciated that a variety of programming languages may be used to implement the teachings described herein.

Likewise, although the scope of claimed subject matter is not limited in this respect, one embodiment may comprise one or more articles, such as a storage medium or storage media. These storage media may have stored thereon instructions that when executed by a computing platform, such as a computer, a computing system, an electronic computing device, and/or other information handling system, for example, may result in an embodiment of a method in accordance with claimed subject matter being executed, for example. The terms "storage medium" and/or "storage media" as referred to herein relate to media capable of maintaining expressions which are perceivable by one or more machines. For example, a storage medium may comprise one or more storage devices for storing machine-readable instructions and/or information. Such storage devices may comprise any one of several media types including, but not limited to, any type of magnetic storage media, optical storage media, semiconductor storage media, disks, floppy disks, optical disks, CD-ROMs, magnetic-optical disks, read-only memories (ROMs), random access memories (RAMs), electrically programmable read-only memories (EPROMs), electrically erasable and/or programmable read-only memories (EEPROMs), flash memory, magnetic and/or optical cards, and/or any other type of media suitable for storing electronic instructions, and/or capable of being coupled to a system bus for a computing platform. However, these are merely examples of a storage medium, and the scope of claimed subject matter is not limited in this respect.

Unless specifically stated otherwise, as apparent from the preceding discussion, it is appreciated that throughout this specification discussions utilizing terms such as processing, computing, calculating, selecting, forming, transforming, converting, enabling, inhibiting, identifying, initiating, communicating, receiving, transmitting, determining, displaying, sorting, applying, varying, delivering, appending, making, presenting, distorting and/or the like refer to the actions and/or processes that may be performed by a computing platform, such as a computer, a computing system, an electronic computing device, and/or other information handling system, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, processes described herein, with reference to flow diagrams or otherwise, may also be executed and/or controlled, in whole or in part, by such a computing platform.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive—or", it may mean "one", it may mean "some, but not all", it may mean "neither", and/or it may mean "both", although the scope of claimed subject matter is not limited in this respect.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method, comprising:
   determining, by one or more processors, two or more image difference areas comprising at least one image difference area in a first rating image indicating a first graphical rating and at least one image difference area in a second rating image indicating a second graphical rating based at least in part on a comparison of the first rating image to the second rating image, wherein the first rating image is associated with a first numerical rating value and the second rating image is associated with a second numerical rating value; and
   determining at least one image tally area that conveys a numerical sub-rating value based at least in part on the image difference areas.

2. The method of claim 1, further comprising converting an unknown rating image to a third numerical rating value based at least in part on the at least one image tally area.

3. The method of claim 1, wherein the at least one image tally area that conveys said numerical sub-rating value comprises a first image tally area that conveys a rating of one, and further comprising converting an unknown rating image to a third numerical rating value based at least in part on matching the first image tally area from a left side of the unknown rating image.

4. The method of claim 1, wherein the at least one image tally area that conveys said numerical sub-rating value comprises a second image tally area that conveys a rating of zero, and further comprising converting an unknown rating image to a third numerical rating value based at least in part on matching the second image tally area from a right side of the unknown rating image and subtracting resultant matches from a rating scale of the unknown rating image.

5. The method of claim 1, wherein the comparison of the first rating image to the second rating image comprises differentiating the first and second rating images.

6. The method of claim 1, wherein said determining two or more image difference areas comprises determining smallest rectangles enclosing an image area which differs between the first and second rating images.

7. The method of claim 1, wherein the at least one image tally area that conveys said numerical sub-rating value comprises a first image tally area that conveys a numerical rating of one and/or a second image tally area that conveys a rating of zero, and wherein said determining the at least one image tally area comprises determining a smallest rectangle enclosing an image area that conveys a rating of one and/or a smallest rectangle enclosing an image area that conveys a rating of zero.

8. The method of claim 1, further comprising:
   determining a total number of the image difference areas;
   determining an expected number of image difference areas based at least in part on a comparison of the first numerical rating value to the second numerical rating value; and
   selecting a process to determine the first and/or the second image tally areas based at least in part on the total number of the image difference areas and/or the expected number of the image difference areas.

9. The method of claim 1, further comprising determining a rating scale based at least in part on matching the at least one image tally area to the first rating image.

10. The method of claim 1, wherein the at least one image tally area that conveys a sub-rating value comprises a first image tally area that conveys a rating of one, and further comprising determining a rating scale based at least in part on matching the first image tally area to the first rating image.

11. The method of claim 1, wherein the at least one image tally area that conveys a sub-rating value comprises a second image tally area that conveys a rating of zero, and further comprising determining a rating scale based at least in part on matching the second image tally area to the first rating image and adding resultant matches to the first rating value.

12. The method of claim 1, further comprising:
   wherein the comparison of the first rating image to the second rating image comprises differentiating the first and second rating images;
   wherein said determining two or more image difference areas comprises determining smallest rectangles enclosing an image area which differs between the first and second rating images; determining a total number of the image difference areas;
   determining an expected number of image difference areas based at least in part on a comparison of the first rating value to the second rating value;
   selecting a process to determine the at least one image tally area based at least in part on the total number of the image difference areas and/or the expected number of the image difference areas, wherein the at least one image tally area that conveys a sub-rating value comprises a first image tally area that conveys a rating of one and/or a second image tally area that conveys a rating of zero;
   wherein said determining the first and/or the second image tally areas comprises determining a smallest rectangle enclosing an image area that conveys a rating of one and/or a smallest rectangle enclosing an image area that conveys a rating of zero;
   determining a rating scale based at least in part on matching the first image tally area or the second image tally area to the first rating image; and
   converting an unknown rating image to a numerical rating value based at least in part on matching the first image tally area or the second image tally area to the unknown rating image.

13. An article comprising:
   a non-transitory storage medium comprising machine-readable instructions stored thereon which are executable by a computing platform to:
   determine two or more image difference areas comprising at least one image difference area in a first rating image indicating a first graphical rating and at least one image difference area in a second rating image indicating a second graphical rating based at least in part on a comparison of the first rating image to the second rating image, wherein the first rating image is associated with a first numerical rating value and the second rating image is associated with a second numerical rating value; and
   determine at least one image tally area that conveys a sub-rating value based at least in part on the image difference areas.

14. The article of claim 13, wherein said machine-readable instructions are further executable by the computing platform to:

convert an unknown rating image to a third numerical rating value based at least in part on the at least one image tally area.

15. The article of claim 13, wherein the at least one image tally area that conveys a sub-rating value comprises a first image tally area that conveys a rating of one, and further comprising converting an unknown rating image to a third numerical rating value based at least in part on matching the first image tally area from a left side of the unknown rating image.

16. The article of claim 13, wherein the at least one image tally area that conveys a sub-rating value comprises a second image tally area that conveys a rating of zero, and further comprising converting an unknown rating image to a third numerical rating value based at least in part on matching the second image tally area from a right side of the unknown rating image and subtracting resultant matches from a rating scale of the unknown rating image.

17. The article of claim 13, wherein said machine-readable instructions are further executable by the computing platform to:
determine a total number of the image difference areas;
determining an expected number of image difference areas based at least in part on a comparison of the first rating value to the second rating value; and
select a process to determine the first and/or the second image tally areas based at least in part on the total number of the image difference areas and/or the expected number of the image difference areas.

18. An apparatus comprising:
a computing platform to:
determine two or more image difference areas comprising at least one image difference area in a first rating image indicating a first graphical rating and at least one image difference area in a second rating image indicating a second graphical rating based at least in part on a comparison of the first rating image to the second rating image, wherein the first rating image is associated with a first numerical rating value and the second rating image is associated with a second numerical rating value; and
determine at least one image tally area that conveys a sub-rating value based at least in part on the image difference areas.

19. The apparatus of claim 18, wherein said computing platform is capable of:
converting an unknown rating image to a third numerical rating value based at least in part on the at least one image tally area.

20. The apparatus of claim 18, wherein said computing platform is capable of:
determining a total number of the image difference areas;
determining an expected number of image difference areas based at least in part on a comparison of the first rating value to the second rating value; and
selecting a process to determine the first and/or the second image tally areas based at least in part on the total number of the image difference areas and/or the expected number of the image difference areas.

21. An apparatus comprising:
means for determining two or more image difference areas comprising at least one image difference area in a first rating image indicating a first graphical rating and at least one image difference area in a second rating image indicating a second graphical rating based at least in part on a comparison of the first rating image to the second rating image, wherein the first rating image is associated with a first numerical rating value and the second rating image is associated with a second numerical rating value; and
means for determining at least one image tally area that conveys a sub-rating value based at least in part on the image difference areas.

22. The apparatus of claim 21, further comprising means for converting an unknown rating image to a third numerical rating value based at least in part on the at least one image tally area.

23. The apparatus of claim 21, further comprising:
means for determining a total number of the image difference areas;
means for determining an expected number of image difference areas based at least in part on a comparison of the first rating value to the second rating value; and
means for selecting a process to determine the first and/or the second image tally areas based at least in part on the total number of the image difference areas and/or the expected number of the image difference areas.

* * * * *